United States Patent
Quan et al.

(10) Patent No.: US 12,526,877 B2
(45) Date of Patent: Jan. 13, 2026

(54) UPLINK SIGNAL LOCATION METHOD, COMMUNICATION BASE STATION, MEASUREMENT BASE STATION, AND UE

(71) Applicant: DATANG MOBILE COMMUNICATIONS EQUIPMENT CO., LTD., Beijing (CN)

(72) Inventors: Haiyang Quan, Beijing (CN); Jianxiang Li, Beijing (CN); Jing Fu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 346 days.

(21) Appl. No.: 18/017,086

(22) PCT Filed: Jul. 20, 2021

(86) PCT No.: PCT/CN2021/107305
§ 371 (c)(1),
(2) Date: Jan. 20, 2023

(87) PCT Pub. No.: WO2022/017369
PCT Pub. Date: Jan. 27, 2022

(65) Prior Publication Data
US 2023/0300942 A1   Sep. 21, 2023

(30) Foreign Application Priority Data

Jul. 22, 2020   (CN) .......................... 202010712303.1

(51) Int. Cl.
H04W 64/00   (2009.01)
H04L 5/00   (2006.01)
(Continued)

(52) U.S. Cl.
CPC ........... *H04W 76/30* (2018.02); *H04L 5/0051* (2013.01); *H04W 64/00* (2013.01); *H04W 76/20* (2018.02)

(58) Field of Classification Search
None
See application file for complete search history.

(56) References Cited

U.S. PATENT DOCUMENTS

| | | |
|---|---|---|
| 2018/0027549 A1 | 1/2018 | Wang et al. |
| 2020/0162289 A1 | 5/2020 | Ahn et al. |
| 2020/0314939 A1* | 10/2020 | Park ....................... H04W 72/12 |

FOREIGN PATENT DOCUMENTS

| | | |
|---|---|---|
| CN | 105282778 A | 1/2016 |
| CN | 106535131 A | 3/2017 |

(Continued)

OTHER PUBLICATIONS

Xiaomi Communications, "Positioning enhancements for RRC Idle and RRC Inactive state UE", 3GPP TSG RAN WG1 #101, e-Meeting, May 25-Jun. 5, 2020, total 3 pages, R1-2003977.

(Continued)

*Primary Examiner* — Suhail Khan
(74) *Attorney, Agent, or Firm* — KILPATRICK TOWNSEND & STOCKTON LLP

(57) ABSTRACT

An uplink signal location method, a communication base station, a measurement base station, and a UE. The uplink signal location method including: the communication base station determines that the UE satisfies the condition of releasing an RRC connection, the UE has a location requirement, and an LMF entity indicates the UE to use the uplink signal location method; transmits an RRC connection release message to the UE, and the RRC connection release message includes an SRS resource that is configured for the UE and used for location when the UE is in an idle state or an inactive state; the UE receives the RRC connection (Continued)

release message, releases the RRC connection and enters the idle state or inactive state, and uses the SRS resource to transmit an SRS.

16 Claims, 8 Drawing Sheets

(51) Int. Cl.
*H04W 76/20* (2018.01)
*H04W 76/30* (2018.01)

(56) References Cited

FOREIGN PATENT DOCUMENTS

| | | | |
|---|---|---|---|
| CN | 110022523 | A | 7/2019 |
| CN | 110650492 | A | 1/2020 |
| CN | 110771199 | A | 2/2020 |
| CN | 110784889 | A | 2/2020 |
| CN | 111278116 | A | 6/2020 |
| CN | 111343567 | A | 6/2020 |
| EP | 4207819 | A1 | 7/2023 |
| WO | 2019160343 | A1 | 8/2019 |
| WO | 2020140668 | A1 | 7/2020 |

OTHER PUBLICATIONS

Qualcomm Incorporated, "Positioning of UEs in RRC Inactive State", 3GPP TSG-RAN WG2 Meeting #114-e, Electronic, May 19-27, 2021, total 9 pages, R2-2106083.

* cited by examiner

UPLINK SIGNAL LOCATION METHOD, COMMUNICATION BASE STATION, MEASUREMENT BASE STATION, AND UE

CROSS REFERENCE TO RELATED APPLICATIONS

The present application is a US National Stage of International Application No. PCT/CN2021/107305, filed Jul. 20, 2021, which claims priority to the Chinese patent application No. 202010712303.1, entitled "UPLINK SIGNAL LOCATION METHOD, COMMUNICATION BASE STATION, MEASUREMENT BASE STATION, AND UE" filed to the China National Intellectual Property Administration on Jul. 22, 2020, the entire contents of which are incorporated herein by reference.

FIELD

The present application relates to the field of wireless communication, in particular to an uplink signal location method, a communication base station, a measurement base station and user equipment (UE).

BACKGROUND

The location technology of the next generation new radio (5G NR) mainly supports the location of terminals in a connected state. For the location of terminals in an idle state and an inactive state, only a downlink signal location method based on a wireless mobile system can be supported at present. Or, a location method irrelevant to wireless mobile communication system signals is supported, such as methods based on a global navigation satellite system (GNSS), wireless local area networks (WLAN), an atmospheric pressure sensor, etc.

The above location methods irrelevant to the wireless mobile communication system signals have certain scene limitations. For example, the GNSS can only be used where enough satellite signals can be received, and the WLAN needs deployment of WLAN. However, for the downlink signal location method based on the wireless mobile system, there are also many problems, for example, in a moving process, the terminal continuously receives location auxiliary data sent through broadcast; and in a non-reception state, reception needs to be enabled, and downlink signals of a plurality of cells are measured. On the one hand, it may not be possible to measure all the cells to be measured in a short time, resulting in poor location accuracy. On the other hand, when a user is a located terminal, it is also necessary to access a network to report measurement results, which is not conducive to power saving for the user.

For terminals in the IDLE state and terminals in the inactive state, the location method based on uplink signals cannot be supported. According to the above location methods currently provided, it may lead to long measurement time and poor location accuracy in some scenes.

SUMMARY

The present application provides an uplink signal location method, a communication base station, a measurement base station and UE to solve the problem that IDLE and inactive terminals cannot support location based on uplink signals.

In one embodiment of the present application provides an uplink signal location method, applied to a communication base station, and including:

determining that a UE satisfies a condition of releasing a radio resource control (RRC) connection, the UE has a location requirement, and a location management function (LMF) entity indicates the UE to use the uplink signal location method; and transmitting an RRC connection release message to the UE; the RRC connection release message includes SRS resource configuration information, and the SRS resource configuration information carries a sounding reference signal (SRS) resource configured for the UE and used for location in an idle state or an inactive state.

In one embodiment, the method further includes:

transmitting the SRS resource to the LMF entity, and the LMF entity transmits the SRS resource to a measurement base station, and the measurement base station performs an SRS measurement according to the SRS resource.

In one embodiment, the RRC connection release message further includes at least one piece of the following information:

a valid duration configured for the SRS resource;
a valid positioning area configured for the SRS resource; or
the quantity of using times configured for the SRS resource.

In one embodiment, the RRC connection release message further includes:

connection resume indication information, configured for indicating whether the UE obtains a new SRS resource for location by resuming the RRC connection when the UE is in the inactive state and reaches a condition of stopping transmitting an SRS.

In one embodiment, before transmitting the RRC connection release message to the UE, the method further includes:

receiving a UE capability information message reported by the UE, and determining whether the UE supports to transmit an SRS in the idle state or the inactive state; or
obtaining a UE capability providing message reported by the UE from the LMF entity, and determining whether the UE supports to transmit an SRS in the idle state or the inactive state.

In one embodiment, the SRS resource configuration information includes a physical resource of an SRS, a cycle and an offset of the SRS; and/or the valid duration configured for the SRS resource is absolute time or a duration relative to a moment when the UE starts to transmit an SRS; and/or
the valid positioning area configured for the SRS resource is any one of the following areas: a cell or a cell list, a tracking area (TA) or a TA list, or a radio access network notification area (RNA).

In one embodiment of the present application provides an uplink signal location method, applied to a UE, and including:

receiving an RRC connection release message including SRS resource configuration information transmitted by a communication base station, and the SRS resource configuration information carries an SRS resource that is configured for the UE and used for location in an idle state or an inactive state; and
entering the idle state or the inactive state by releasing an RRC connection, and transmitting an SRS by using the SRS resource.

In one embodiment, the RRC connection release message further includes at least one piece of the following information:

a valid duration configured for the SRS resource;

a valid positioning area configured for the SRS resource; or the quantity of using times configured for the c SRS resource.

In one embodiment, the method further includes:
stopping transmitting the SRS by using the SRS resource and keeping in the idle state when the UE is currently in the idle state and determines that a condition of stopping transmitting the SRS is reached.

In one embodiment, the method further includes:
obtaining a new SRS resource for location by entering a connected state through a resume process when the UE is currently in the inactive state and determines that a condition of stopping transmitting the SRS is reached.

In one embodiment, the method further includes:
determining, when the UE determines that a condition of stopping transmitting the SRS is reached, whether to obtain a new SRS resource for location by entering a connected state through a resume process according to a connection resume indication in the RRC connection release message.

In one embodiment, the determining that the condition of stopping transmitting the SRS is reached, includes:
determining that the condition of stopping transmitting the SRS is reached when the UE determines that any one of the following conditions is met: the valid duration being invalid, leaving the valid positioning area or the SRS resource being used up to the quantity of using times.

In one embodiment, the method further includes:
reporting whether the UE supports to transmit the SRS in the idle state or the inactive state through a UE capability information message or a UE capability providing message.

In one embodiment, the SRS resource configuration information includes a physical resource of an SRS, a cycle and an offset of the SRS; and/or
the valid duration configured for the SRS resource is absolute time or a duration relative to a moment when the UE starts to transmit an SRS; and/or
the valid positioning area configured for the SRS resource is any one of the following areas: a cell or a cell list, a tracking area (TA) or a TA list, or an RNA.

In one embodiment of the present application provides an uplink signal location method, applied to a measurement base station, and including:
receiving an SRS resource that is configured for UE by a communication base station, used in an idle state or an inactive state and transmitted by an LMF entity; and
performing an SRS measurement on the UE according to the SRS resource.

In one embodiment, the method further includes: receiving at least one piece of the following information that is configured for the UE by the communication base station and transmitted by the LMF entity:
a valid duration configured for the SRS resource;
a valid positioning area configured for the SRS resource; or
the quantity of using times configured for the SRS resource.

In one embodiment of the present application provides A communication base station for uplink signal location, including a memory and a processor,
the memory is configured to store computer programs; and
the processor is configured to read the computer programs in the memory and execute following operations:

determining that a UE satisfies a condition of releasing an RRC connection, the UE has a location requirement, and an LMF entity indicates the UE to use an uplink signal location method; and
transmitting an RRC connection release message to the UE, and the RRC connection release message includes SRS resource configuration information, and the SRS resource configuration information carries an SRS resource that is configured for the UE and used for location in an idle state or an inactive state.

In one embodiment, the processor is further configured to:
transmit the SRS resource to the LMF entity, and the LMF entity transmits the SRS resource to a measurement base station, and the measurement base station performs an SRS measurement according to the SRS resource.

In one embodiment, the RRC connection release message further includes at least one piece of the following information:
a valid duration configured for the SRS resource;
a valid positioning area configured for the SRS resource; or
the quantity of using times configured for the SRS resource.

In one embodiment, the RRC connection release message further includes:
connection resume indication information, configured for indicating whether the UE obtains a new SRS resource for location by resuming the RRC connection when the UE is in the inactive state and reaches a condition of stopping transmitting an SRS.

In one embodiment, before transmitting the RRC connection release message to the UE, the processor is further configured to:
receive a UE capability information message reported by the UE, and determine whether the UE supports to transmit an SRS in the idle state or the inactive state; or
obtain a UE capability providing message reported by the UE from the LMF entity, and determine whether the UE supports to transmit an SRS in the idle state or the inactive state.

In one embodiment, the SRS resource configuration information includes a physical resource of an SRS, a cycle and an offset of the SRS; and/or
the valid duration configured for the SRS resource is absolute time or a duration relative to a moment when the UE starts to transmit an SRS; and/or
the valid positioning area configured for the SRS resource is any one of the following areas: a cell or a cell list, a tracking area (TA) or a TA list, or a radio access network notification area (RNA).

In one embodiment of the present application provides a user equipment (UE) for uplink signal location, including a memory and a processor,
the memory is configured to store computer programs; and
the processor is configured to read the computer programs in the memory and execute following operations:
receiving an RRC connection release message including SRS resource configuration information transmitted by a communication base station, and the SRS resource configuration information carries an SRS resource that is configured for the UE and used for location in an idle state or an inactive state; and
entering the idle state or the inactive state by releasing an RRC connection, and transmitting an SRS by using the SRS resource.

In one embodiment, the RRC connection release message further includes at least one piece of the following information:
   a valid duration configured for the SRS resource;
   a valid positioning area configured for the SRS resource; or
   the quantity of using times configured for the SRS resource.

In one embodiment, the processor is further configured to:
   stop transmitting the SRS by using the SRS resource and keep in the idle state when the UE is currently in the idle state and determines that a condition of stopping transmitting the SRS is reached.

In one embodiment, the processor is further configured to:
   obtain a new SRS resource for location by entering a connected state through a resume process when the UE is currently in the inactive state and determines that a condition of stopping transmitting the SRS is reached.

In one embodiment, the processor is further configured to:
   determine, when the UE determines that a condition of stopping transmitting the SRS is reached, whether to obtain a new SRS resource for location by entering a connected state through a resume process according to a connection resume indication in the RRC connection release message.

In one embodiment, the determining, by the processor, that the condition of stopping transmitting the SRS is reached, includes:
   determining that the condition of stopping transmitting the SRS is reached when the UE determines that any one of the following conditions is met: the valid duration being invalid, leaving the valid positioning area or the SRS resource being used up to the quantity of using times.

In one embodiment, the processor is further configured to:
   report whether the UE supports to transmit the SRS in the idle state or the inactive state through the UE capability information message or a UE capability providing message.

In one embodiment, the SRS resource configuration information includes a physical resource of an SRS, a cycle and an offset of the SRS; and/or
   the valid duration configured for the SRS resource is absolute time or a duration relative to a moment when the UE starts to transmit an SRS; and/or
   the valid positioning area configured for the SRS resource is any one of the following areas: a cell or a cell list, a tracking area (TA) or a TA list, or an RNA.

In one embodiment of the present application provides a measurement base station for uplink signal location, including a memory and a processor,
   the memory is configured to store computer programs; and
   the processor is configured to read the computer programs in the memory and execute following operations:
   receiving an SRS resource that is configured for UE by a communication base station, used in an idle state or an inactive state and transmitted by an LMF entity; and
   performing an SRS measurement on the UE according to the SRS resource.

In one embodiment, the processor is further configured to: receive at least one piece of the following information that is configured for the UE by the communication base station and transmitted by the LMF entity:
   a valid duration configured for the SRS resource;
   a valid positioning area configured for the SRS resource; or
   the quantity of using times configured for the SRS resource.

In one embodiment of the present application provides a communication base station for uplink signal location, including:
   a determining device, configured to determine that a UE satisfies a condition of releasing an RRC connection, the UE has a location requirement, and an LMF entity indicates the UE to use an uplink signal location method; and
   a transmitting device, configured to transmit an RRC connection release message to the UE, and the RRC connection release message includes SRS resource configuration information, and the SRS resource configuration information carries a channel sounding reference signal (SRS) resource that is configured for the UE and used for location in an idle state or an inactive state.

In one embodiment, the transmitting device is further configured to:
   transmit the SRS resource to the LMF entity, and the LMF entity transmits the SRS resource to a measurement base station, and the measurement base station performs an SRS measurement according to the SRS resource.

In one embodiment, the RRC connection release message further includes at least one piece of the following information:
   a valid duration configured for the SRS resource;
   a valid positioning area configured for the SRS resource; or
   the quantity of using times configured for the SRS resource.

In one embodiment, the RRC connection release message further includes:
   connection resume indication information, configured for indicating whether the UE obtains a new SRS resource for location by resuming the RRC connection when the UE is in the inactive state and reaches a condition of stopping transmitting an SRS.

In one embodiment, before transmitting the RRC connection release message to the UE, the determining device is further configured to:
   receive a UE capability information message reported by the UE, and determine whether the UE supports to transmit an SRS in the idle state or the inactive state; or
   obtain a UE capability providing message reported by the UE from the LMF entity, and determine whether the UE supports to transmit an SRS in the idle state or the inactive state.

In one embodiment, the SRS resource configuration information includes a physical resource of an SRS, a cycle and an offset of the SRS; and/or
   the valid duration configured for the SRS resource is absolute time or a duration relative to a moment when the UE starts to transmit an SRS; and/or
   the valid positioning area configured for the SRS resource is any one of the following areas: a cell or a cell list, a tracking area (TA) or a TA list, or a radio access network notification area (RNA).

In one embodiment of the present application provides a UE for uplink signal location, including:
   an RRC message receiving device, configured to receive an RRC connection release message including SRS resource configuration information and transmitted by a communication base station, and the SRS resource configuration information carries an SRS resource that is configured for the UE and used for location in an idle state or an inactive state; and an RRC connection releasing device, configured to enter the idle state or the inactive state by releasing an RRC connection, and transmit an SRS by using the SRS resource.

In one embodiment, the RRC connection release message further includes at least one piece of the following information:

a valid duration configured for the SRS resource;

a valid positioning area configured for the SRS resource; or the quantity of using times configured for the SRS resource.

In one embodiment, the RRC connection releasing device is further configured to:

stop using the SRS resource to transmit the SRS and keep in the idle state when the UE is currently in the idle state and determines that a condition of stopping transmitting the SRS is reached.

In one embodiment, the RRC connection releasing device is further configured to obtain a new SRS resource for location by entering a connected state through a resume process when the UE is currently in the inactive state and determines that a condition of stopping transmitting the SRS is reached.

In one embodiment, the RRC connection releasing device is further configured to:

determine, when the UE determines that a condition of stopping transmitting the SRS is reached, whether to obtain a new SRS resource for location by entering a connected state through a resume process according to a connection resume indication in the RRC connection release message.

In one embodiment, the determining, by the RRC connection releasing device, that the condition of stopping transmitting the SRS is reached, includes:

determining that the condition of stopping transmitting the SRS is reached when the UE determines that any one of the following conditions is met: the valid duration being invalid, leaving the valid positioning area or the SRS resource being used up to the quantity of using times.

In one embodiment, the RRC connection releasing device is further configured to:

report whether the UE supports to transmit the SRS in the idle state or the inactive state through a UE capability information message or a UE capability providing message.

In one embodiment, the SRS resource configuration information includes a physical resource of an SRS, a cycle and an offset of the SRS; and/or the valid duration configured for the SRS resource is absolute time or a duration relative to a moment when the UE starts to transmit an SRS; and/or the valid positioning area configured for the SRS resource is any one of the following areas: a cell or a cell list, a tracking area (TA) or a TA list, or an RNA.

In one embodiment of the present application provides a measurement base station for uplink signal location, including:

an SRS resource receiving device, configured to receive an SRS resource that is configured for a UE by a communication base station, used in an idle state or an inactive state and transmitted by an LMF entity; and a measurement device, configured to perform an SRS measurement on the UE according to the SRS resource.

In one embodiment, the SRS resource receiving device is further configured to: receive at least one piece of the following information that is configured for the UE by the communication base station and transmitted by the LMF entity:

a valid duration configured for the SRS resource;

a valid positioning area configured for the SRS resource; or the quantity of using times configured for the SRS resource.

One embodiment of the present application provides a computer program medium, the computer program medium stores computer programs, and the computer programs, when executed by a processor, implements operations of the above uplink signal location method provided by the embodiments, or the computer programs, when executed by a processor, implements operations of the above uplink signal location method provided by other embodiments, or the computer programs, when executed by a processor, implements operations of the above uplink signal location method provided by the embodiments.

According to the embodiment of the present application, a chip is provided. The chip is coupled with a memory in a device, and the chip, when running, calls program instructions stored in the memory, to implement the above embodiments and any possible methods involved in each of the embodiment of the present application.

According to the embodiment of the present application, a computer program product is provided. The computer program product, when running on an electronic device, enables the electronic device to implement the above embodiments and any possible methods involved in each of the embodiment of the present application.

The uplink signal location method, the communication base station, the measurement base station and the UE provided by the embodiments of the present application have the following beneficial effects:

according to the present application, in the idle state or the inactive state, a terminal continues to transmit the SRS used for location to satisfy the measurement requirement of uplink location, to saving power, ensuring that a network performs timely and effective location measurement and calculation, and improving location accuracy.

DETAILED DESCRIPTION OF THE EMBODIMENTS

The solutions in the embodiments of the present application will be clearly and completely described below with reference to the accompanying drawings in the embodiments of the present application. Apparently, the described embodiments are only a part of the embodiments of the present application, not all of the embodiments.

According to a current location architecture, an LMF entity is responsible for selecting a location method and triggering corresponding location measurement, and may calculate a final location result and location accuracy. A 5G next generation-radio access network (NG-RAN) may transmit a location reference signal or perform location measurement based on auxiliary information; and may also calculate a final location result and location accuracy based on a measurement result.

Figure 1:
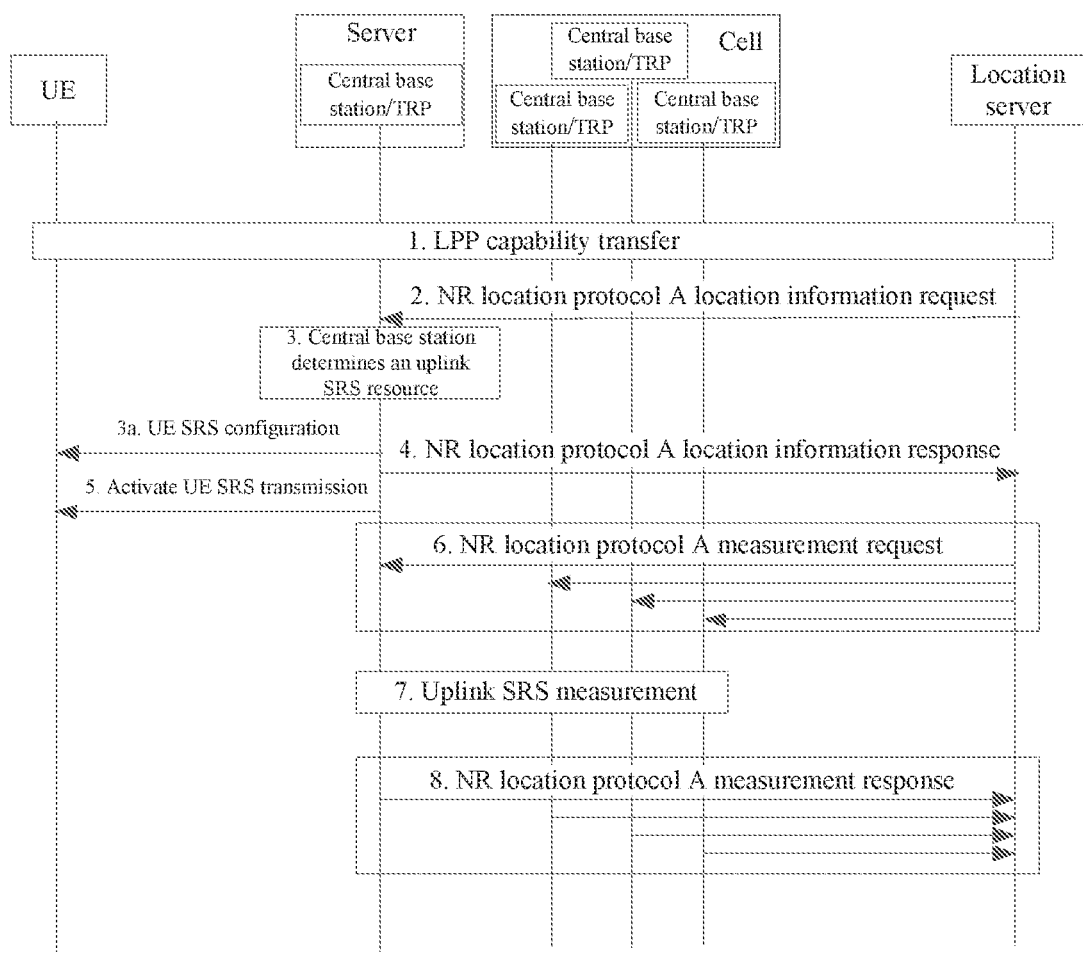
FIG. 1 is a flow chart of a network-based uplink location NR UL-TDOA method/uplink location NR UL-AoA method.

Based on the above location architecture, an adopted location method includes a network-based new radio up link-time difference of arrival (NR UL-TDOA) method and a network-based new radio up link-arrival of angle (NR UL-AoA) method. As shown in FIG. 1, which is a flow chart of the network-based uplink location NR UL-TDOA method/uplink location NR UL-AoA method, the location process is as follows.

1) The Network-Based Uplink Location NR UL-TDOA Method.

A base station, which serving a UE, configures time and frequency resources of uplink sounding reference signal used for positioning (SRS-Pos) for the UE, and transmits the time and the frequency resources to the UE, and notifies an LMF entity of configuration information of the SRS-Pos.

The LMF entity transmits the configuration information of the SRS-Pos received from the base station to transmission or reception points (TRPs) around the UE. Each TRP detects the SRS-Pos transmitted by the UE according to the configuration information of the SRS-Pos, and obtains UL relative time of arrival (UL RTOA) of arrival time of the SRS-Pos and TRP's own reference time. The UL-TDOA generally adopts a network-based location mode, that is, each TRP transmits the measured UL RTOA to the LMF entity, and the LMF entity uses the UL RTOA provided by each TRP and other known information (such as geographical coordinates of each TRP) to calculate a position of the UE.

2) The Network-Based Uplink Location NR UL-AoA Method.

The base station serving a UE configures and transmits time and frequency resources of SRS-Pos to the UE, and notifies an LMF entity of configuration information of the SRS-Pos.

The LMF entity transmits the configuration information of the SRS-Pos received from the base station to TRPs around the UE. Each TRP needs to receive the SRS-Pos transmitted by the UE according to the configuration information of the SRS-Pos, and obtains UL AoA. Each TRP reports the UL AoA to the LMF entity, and the LMF entity uses the UL AoA provided by each TRP and other known information (such as geographical coordinates of each TRP) to calculate a position of the UE.

An existing location method only supports an uplink signal location method in a connected state, and for terminals in the idle state and the inactive state, the location method based on uplink signals cannot be supported. However, if a current downlink signal location method or a location method irrelevant to wireless mobile communication system signals is adopted, on the one hand, it may not be possible to measure all cells to be measured in a short time, to result in poor location accuracy or location failure; on the other hand, when a user is as a located terminal, it is also necessary to access a network to report measurement results, which causes the terminal to continuously enter the connected state, or is not conducive to power saving for the user.

Aiming at the above problem, the embodiments of the present application provide the uplink signal location method, the communication base station, the measurement base station and the UE, and provides a solution to support uplink signal location in the idle state or the inactive state, to satisfy the measurement requirement of uplink location, to achieve the purposes of saving terminal power, to ensure that a network performs timely and effective location measurement and calculation, and to improve location accuracy.

The method and the apparatus are based on the same application concept, since the principles of the method and the apparatus to solve the problem are similar, implementations of the apparatus and the method can be referred to each other, and repetitions will not be made.

The solutions provided by the embodiments of the present application may be applied to a variety of systems, especially a 5G system. For example, the applicable systems may be a global system of mobile communication (GSM), a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD), a universal mobile telecommunication system (UMTS), a worldwide interoperability for microwave access (WiMAX) system, a 5G system, a 5G NR system and the like. These various systems include terminal devices and network devices.

User equipment (UE) involved in the embodiments of the present application may refer to a device that provides voice and/or data connectivity to a user, a handheld device with a wireless connection function, or other processing devices connected to a wireless modem. In different systems, the name of the terminal device may be different. For example, in the 5G system, the terminal device may be called UE. The wireless terminal device may communicate with one or more core networks via a radio access network (RAN). The wireless terminal device may be a mobile terminal device, such as a mobile phone (or called "cellular" phone) and a computer with a mobile terminal device, for example, may be a portable, pocket-size, handheld, computer built-in or vehicle-mounted mobile apparatus, which exchange language and/or data with a wireless access network. For example, it may be devices such as a personal communication service (PCS) telephone, a cordless telephone, a session initiated protocol (SIP) telephone, a wireless local loop (WLL) station, and a personal digital assistant (PDA). The wireless terminal device may also be called a system, a subscriber device, a subscriber station, a mobile station, a mobile, a remote station, an access point, a remote terminal, an access terminal, a user terminal, a user agent and a user device, which is not limited in the embodiments of the present application.

The base station involved in the embodiments of the present application may include a plurality of cells. According to different specific application scenarios, the base station may also be called an access point, or may refer to a device in an access network that communicates with a wireless terminal device through one or more sectors on an air interface, or other names. The network device may be configured to mutually convert received air frames and internet protocol (IP) packets, and act as a router between the wireless terminal device and the rest of the access network, and the rest of the access network may include an internet protocol (IP) communication network. The network device may further coordinate attribute management of the air interface. For example, the network device involved in the embodiments of the present application may be a global system for mobile communications (GSM) or a base transceiver station (BTS) in code division multiple access (CDMA), may also be a NodeB in wide-band code division multiple access (WCDMA), may further be an evolutional node B, eNB or e-NodeB in a long term evolution (LTE) system, a 5G base station in a 5G network architecture (next generation system), and may also be a home evolved node B (HeNB), a relay node, a femto, a pico and the like, which is not limited in the embodiments of the present application.

Various embodiments of the present application will be described in detail below in combination with the accompanying drawings of the specification. It needs to be noted that a display order of the embodiments of the present application only represents a sequential order of the embodiments, and does not represent the priority of the embodiments.

Embodiment 1

Figure 2:
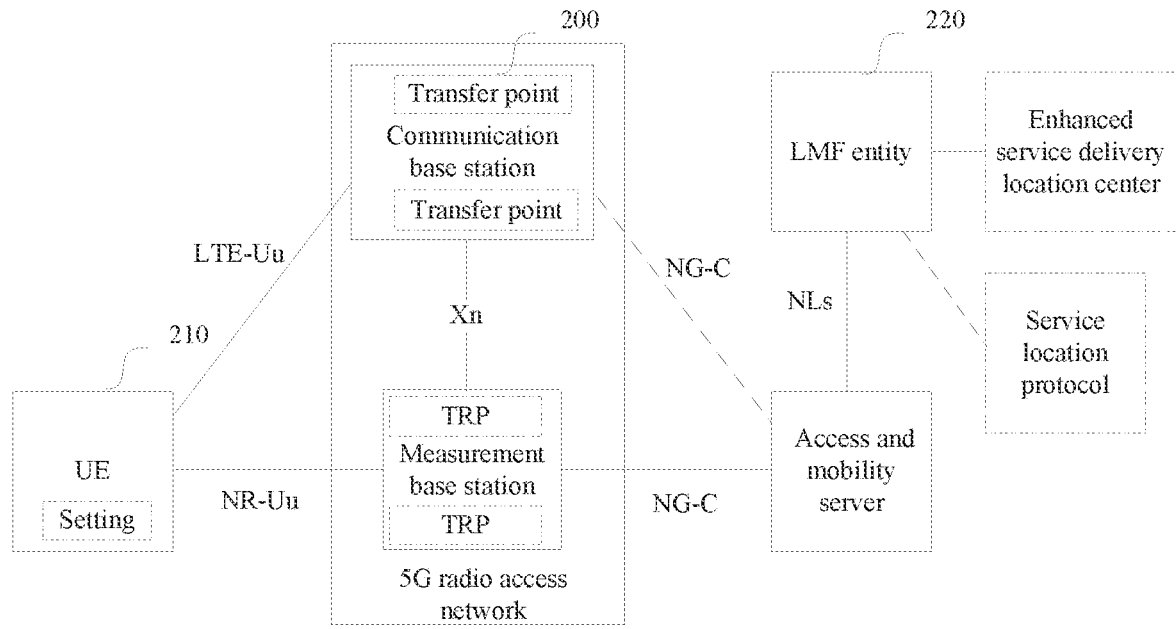
FIG. 2 is a schematic diagram of an uplink signal location system provided by an embodiment of the present application.

As shown in FIG. 2, the present application provides an uplink signal location system, including:

a communication base station 200, configured to determine that a UE satisfies a condition of releasing an RRC connection, the UE has a location requirement, and an LMF entity indicates the UE to use an uplink signal location method; and transmit an RRC connection release message to the UE. The RRC connection release message includes SRS resource configuration information, and the SRS resource configuration information carries an SRS resource that is configured for the UE and used for location in an idle state or an inactive state.

The above condition of releasing the RRC connection that UE is determined to satisfy may be a condition specified in a current protocol. As described above, the UE satisfies the condition of releasing the RRC connection, and the UE has the location requirement, and for a situation where the UE currently has no online service to satisfy releasing of the RRC connection, it may be understood that the UE currently only has a location service.

In the embodiments of the present application, when the base station transmits the RRC connection release message to the UE, the RRC connection release message carries the SRS resource configuration information, and the SRS resource configuration information carries a channel sounding reference signal (SRS) resource that is configured for the UE and used in the idle state or the inactive state.

UE 210, configured to receive the RRC connection release message including the SRS resource configuration information and transmitted by a communication base station, and the SRS resource configuration information carries an SRS resource for location; and enter the idle state or the inactive state by releasing the RRC connection, and transmit an SRS by using the SRS resource.

After the UE receives the RRC connection release message transmitted by the base station, the RRC connection release message carries the SRS resource that is configured for the UE and used in the idle state or the inactive state, and then the UE may determine resource information used for transmitting the SRS, and use the determined SRS resource to transmit the SRS.

The above SRS resource configuration information at least includes a physical resource of the SRS, a cycle and an offset of the SRS; and further includes any one piece or more pieces of the following information:

a valid duration configured for the SRS resource;

absolute time or a duration relative to a moment when the UE starts to transmit an SRS; or a valid positioning area configured for the SRS resource, such as any one of the following areas: a cell or a cell list, a tracking area (TA) or a TA list, or a radio access network notification area (RNA); and the quantity configured for using times of the SRS resource, such as 20 times, 50 times and 100 times.

An LMF entity 220, configured to indicate the communication base station that the UE uses the uplink signal location method.

The LMF entity determines the location method adopted by the UE and indicates the location method to the communication base station, and the LMF entity may adopt a prior art to determine the location method adopted by the UE, which will not be detailed here.

The embodiments of the present application provide a method that in the idle state or the inactive state, the UE continues to transmit the SRS used for location to satisfy the measurement requirement of uplink location. Therefore, the located terminal may enter the idle state or the inactive state without other services, and only transmit the SRS to a network side for measurement, to achieve the purposes of saving terminal power, to ensure that a network performs timely and effective location measurement and calculation, and to improve location accuracy.

In one embodiment, the above base station is further configured to transmit the SRS resource to the LMF entity, and the LMF entity transmits the SRS resource to a relevant measurement base station, and the relevant measurement base station performs an SRS measurement according to the SRS resource. The system further includes:

a measurement base station, configured to receive the SRS resource that is configured for the UE by a communication base station, used in the idle state or the inactive state and transmitted by the LMF entity; and perform an SRS measurement on the UE according to the SRS resource.

The measurement base station reports a measurement result to the LMF entity, and the LMF entity uses the measurement result to locate the UE. A location mode that the LMF entity calculates the UE location may be a network-based uplink location NR UL-TROA method or a network-based uplink location NR UL-AoA method, and a calculation process is the prior art, which will not be detailed here.

During implementation, before transmitting the RRC connection release message, the communication base station forwards, to the LMF entity, the SRS configuration information that is to be configured for the UE and used in the idle state or the inactive state, and meanwhile notifies the LMF entity that the UE will enter the idle state or a connected state. The LMF entity selects a measurement base station that needs to perform UE uplink SRS location signal measurement according to a current location of the UE, and transmits the SRS configuration information of the UE to the relevant measurement base station. The information (TRP information or the cell list or other information) of the measurement base station selected by the LMF entity for UE SRS measurement is transmitted to a communication base station to which a service cell where the UE is located belongs. The LMF entity may also modify the SRS configuration information, and transmit the modified SRS configuration information to the communication base station for reference. For example, the LMF entity may give suggestions on the quantity of times of transmitting the SRS or the valid duration of transmitting the SRS, the communication base station may determine the valid positioning area, the valid duration, the quantity of using times and the like for the UE to transmit the SRS according to the information transmitted by the LMF entity.

In one embodiment, the base station is configured to determine that the UE satisfies the condition of releasing the RRC connection, and when the UE has the location requirement, the base station is further configured to determine whether the UE supports to transmit the SRS in the idle state or the inactive state, and transmit the above RRC connection release message carrying the SRS resource to the UE that supports to transmit the SRS in the idle state or the inactive state.

A location capability in a long term evolution positioning protocol (LPP) includes a location method supported by a target device, different embodiments supported by a certain location method (such as a supported A-GNSS auxiliary data type) and some common features of location that are not limited to a certain location method (such as a capability to process a plurality of LPP transactions).

In the embodiments, the LPP location capability transfer transaction may be triggered by a network side request (the communication base station or the LMF entity) or actively reported by the target device (UE).

Figure 3:
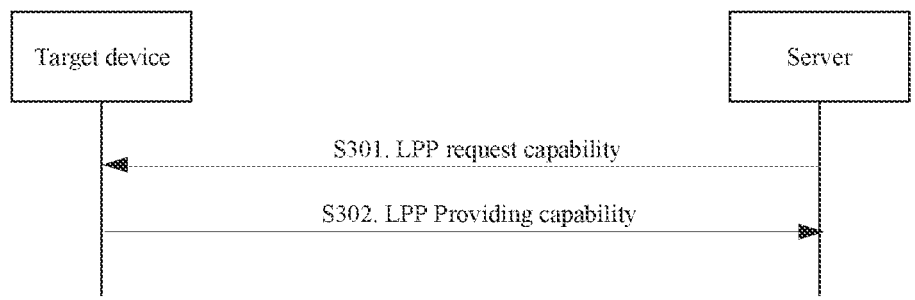
FIG. 3 is a schematic diagram of steps of an LPP capability transmission process triggered by a network side request.

Steps of an LPP capability transmission process triggered by a network side request are shown in FIG. 3 and include:
step S301, a network side transmits an LPP request capability message to request a relevant location capability of UE; and
step S302, the UE transmits the relevant location capability to the network side, and the relevant location capability may contain a specific location method, commonalities of some location methods and the like.

Figure 4:
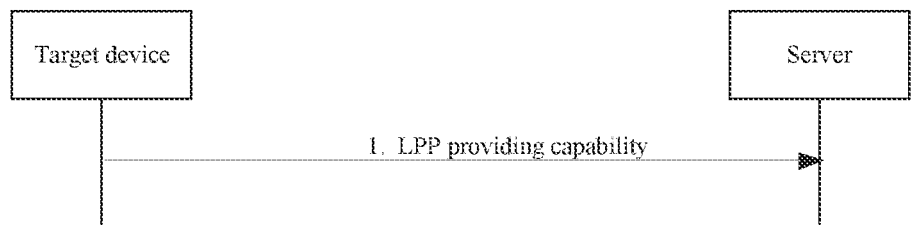
FIG. 4 is a schematic diagram of steps of UE actively transmitting capability information through an LPP capability indication process.

Actively transmitting capability information through an LPP capability indication process, as shown in FIG. 4, includes:
the UE actively reports an LPP providing capability to the network side.

In the embodiments, the above network side may be a base station or an LMF entity in a 5G location architecture.

In one embodiment, the communication base station is further configured to: receive a UE capability information message reported by the UE, and determine whether the UE supports to transmit an SRS in the idle state or the inactive state, the above UE capability information message may be an RRC message, and the above active request mode or the UE active transmission mode may be adopted; or obtain a UE capability providing message reported by the UE from the LMF entity, and determine whether the UE supports to transmit the SRS in the idle state or the inactive state, and the above UE capability providing message may be an LPP protocol message.

The LMF entity is further configured to: receive an LPP message reported by the UE, and determine whether the UE supports to transmit the SRS in the idle state or the inactive state; and transmit the LPP message reported by the UE to the base station, and the base station determines whether the UE supports to transmit the SRS in the idle state or the inactive state according to the LPP message. The LMF entity may obtain the above LPP message by adopting the active request or UE active transmission mode.

In one embodiment, the UE is further configured to report whether the UE supports to transmit the SRS in the idle state or inactive state through the UE capability information message or the UE capability providing message, and the active transmission mode or a transmission mode based on the network side request may be adopted by the UE.

Through the RRC and LPP messages, the UE may transmit to the base station and the LMF entity, the capability that whether it supports to transmit the location SRS in the idle state and whether it supports to transmit the location SRS in the inactive state.

The base station and the LMF entity may decide whether the UE needs to execute transmitting the SRS in the idle state or the inactive state according to relevant capabilities and service situations of the UE.

The RRC protocol message is a UE capability information message, and the LPP protocol is a UE capability providing message.

In one embodiment, stopping transmitting the SRS by using the SRS resource and keeping in the idle state when the above UE determines that it is currently in the idle state and the condition of stopping transmitting the SRS is reached.

A new SRS resource is obtained by entering a connected state through a resume process when the above UE determines that it is currently in the inactive state and the condition of stopping transmitting the SRS is reached.

The above SRS configuration information further includes information used for determining whether the condition of stopping transmitting the SRS is reached, and the UE determines whether the condition of stopping transmitting the SRS is reached according to these information.

When the above UE reaches the condition of stopping transmitting the SRS in the inactive state, the new SRS resource may be obtained by entering the connected state through the resume process by default, and it may further be determined whether to obtain the new SRS resource by entering the connected state through the resume process according to the indication of the network side.

Further, the RRC connection release message indicated by the above communication base station further includes:

connection resume indication information, configured for indicating whether the UE obtains a new SRS resource by resuming the RRC connection when the UE reaches a condition of stopping transmitting an SRS.

When the UE determines that it is currently in the inactive state, and the condition of stopping transmitting the SRS is reached, whether to obtain the new SRS resource by entering the connected state through the resume process is determined according to a connection resume indication in the RRC connection release message.

In the embodiments, the above SRS resource configuration information at least includes:

a physical resource of the SRS; and a cycle and an offset of the SRS.

In the embodiments, the RRC connection release message further includes at least one piece of the following information.

1) A Valid Duration Configured for the SRS Resource.

The failure of the valid duration configured for the SRS resource may be used for determining whether the condition of stopping transmitting the SRS is reached, that is, the UE determines that the condition of stopping transmitting the SRS is reached when determines the valid duration is invalid.

The SRS configuration information contains the valid duration, the UE enables a timer when entering the idle state, and a timing length of the timer is the valid duration length. Before the timer runs out of time, the UE transmits the SRS according to the configured SRS cycle.

When the timer runs out of time, the UE stops transmitting the SRS.

The valid duration for the above configured SRS resource may be in any of the following ways:

a duration relative to a moment when the UE starts to transmit the SRS, such as 500 milliseconds, 30 seconds, 40 minutes, 1 hour, etc., that is, the UE starts timing from the moment when it starts to transmit the SRS, and stops transmitting the SRS when a timing duration reaches the duration;

absolute time, such as at which hour, which minute and which second, that is, transmitting is stopped when it reaches the time.

Note: in addition to the valid duration, the base station may further indicate whether the UE in the inactive state needs to obtain new parameters by resuming the RRC connection after reaching the valid duration.

2) A Valid Positioning Area Configured for the SRS Resource.

Leaving the valid positioning area configured for the SRS resource may be used for determining whether the condition of stopping transmitting the SRS is reached, that is, when the UE determines that it leaves the valid positioning area configured for the SRS resource, and the condition of stopping transmitting the SRS is reached.

The valid positioning area configured for the above SRS resource may be in any of the following ways:

a cell or a cell list;

a TA or a TA list; or a radio access network notification area (RNA).

Note: for the UE in the inactive state, if the RNA is configured, the UE will automatically execute an RNA update process when the UE leaves the area, to obtain a new configuration. If a configured area region is smaller than RNA, the base station may independently indicate whether to enter the connected state to obtain the new configuration after leaving the valid positioning area.

3) The Quantity of Using Times Configured for the SRS Resource.

Reaching the quantity of using times configured for the SRS resource may be used for determining whether the condition of stopping transmitting the SRS is reached, that is, when the UE determines that the quantity of using times configured for the SRS resource is reached, the condition of stopping transmitting the SRS is reached.

For the quantity of using times configured for the above SRS resource, it may be configured as 10 times, 20 times, 50 times, etc.

It should be noted that the determining that the condition of stopping transmitting the SRS is reached, includes:

determining that the condition of stopping transmitting the SRS is reached when the UE determines that any one of the following conditions is met: the valid duration being invalid, leaving the valid positioning area or the SRS resource being used up to the quantity of using times.

It should be noted that the base station may further indicate whether the UE in the inactive state needs to obtain new parameters by resuming the RRC connection after reaching the condition of stopping transmitting the SRS.

An uplink signal location flow corresponding to the UE in the idle state or the inactive state respectively is shown below.

It should be noted that when the UE currently is in the inactive state, and determines that the condition of stopping transmitting the SRS is reached, the new SRS resource is obtained by entering the connected state through the resume process.

If the configuration information contains the valid duration, the UE enables the timer when entering the inactive state, and the timing length of the timer is the valid duration length. Before the timer runs out of time, the UE transmits the SRS according to the configured SRS cycle. When the timer runs out of time, the UE stops transmitting the SRS. The UE may enter the connected state through the resume process, and if the base station has a new SRS resource to be configured for the UE, the UE may use the new SRS resource to transmit the SRS subsequently.

If the configuration information contains the valid positioning area, the UE transmits the SRS according to the SRS configuration within the valid positioning area. The UE, when moving beyond the valid positioning area, stops transmitting the SRS. The UE may enter the connected state through the resume process (an RRC connection resume process), and if the base station has a new SRS resource to be configured for the UE, the UE may use the new SRS resource to transmit the SRS subsequently.

If the configuration information contains the quantity of using times, a counter is enabled when the UE enters the idle state, and the counter will be increased by 1 each time the SRS is transmitted. When the count of the counter is equal to the quantity of using times in the configuration information, the UE will not transmit the SRS anymore. The UE may enter the connected state through the resume process, and if the base station has a new SRS resource to be configured for the UE, the UE may use the new SRS resource to transmit the SRS subsequently.

The base station on the network side measures the SRS of the UE according to the SRS configuration information transmitted to the UE, and reports the measurement result to the LMF entity.

Implementation 1.

Figure 5:
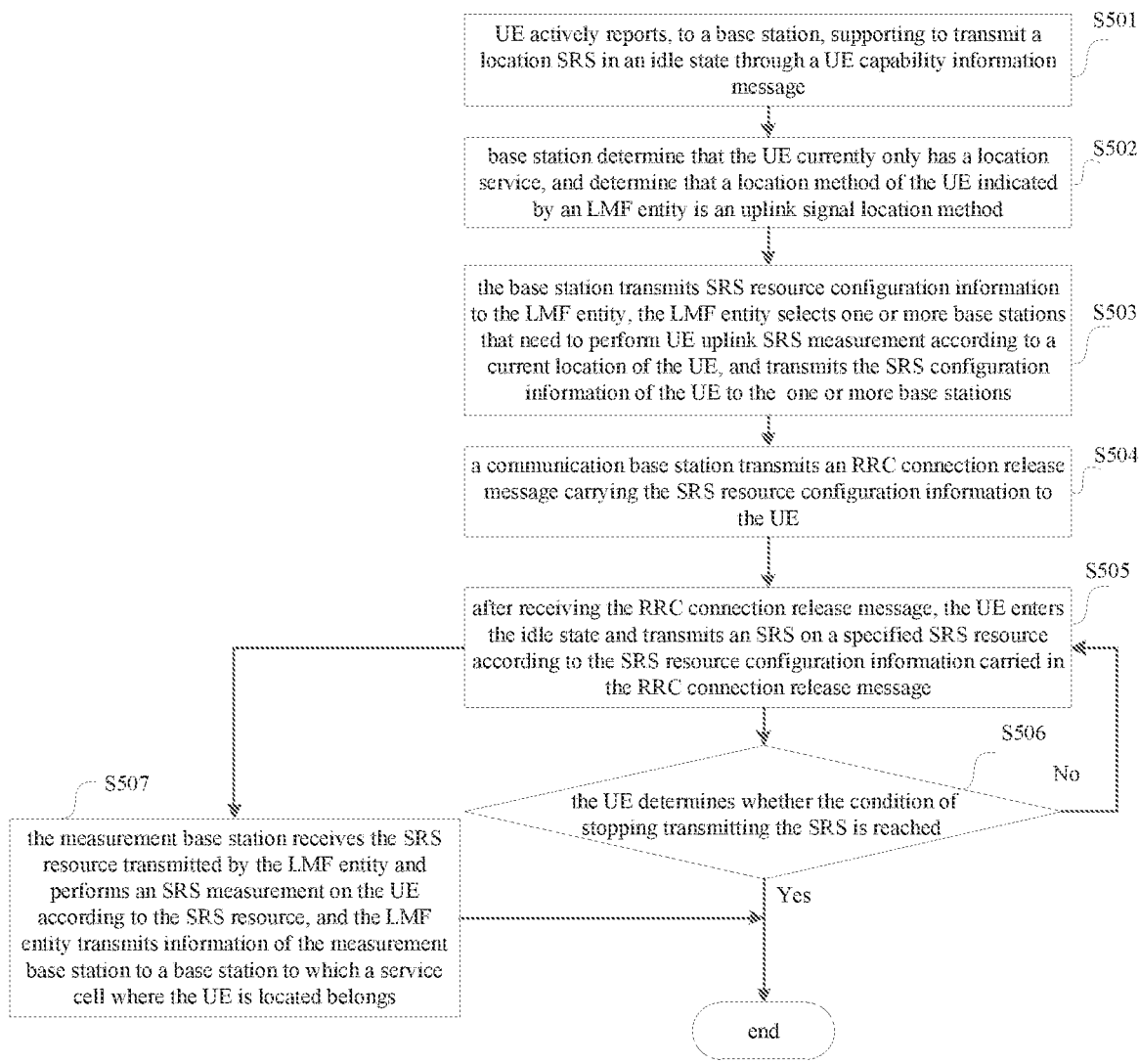
FIG. 5 is a flow chart of uplink signal location in an idle state.

FIG. 5 is a flow of uplink signal location in an idle state, which includes the following steps.

S501, UE actively reports, to a base station, supporting to transmit a location SRS in an idle state through a UE capability information message.

S502, when the base station may determine that the UE currently only has a location service, and determine that a location method of the UE indicated by an LMF entity is an uplink signal location method according to the UE capability information message and a service situation of the UE, S503 is executed; and if the location method of the UE indicated by the LMF entity is not the uplink signal location method, an existing flow is executed, such as a downlink signal location method of a wireless mobile system, which will not be repeated here.

S503, the base station transmits SRS resource configuration information to the LMF entity, the LMF entity selects one or more base stations that need to perform UE uplink SRS measurement according to a current location of the UE, and transmits the SRS configuration information of the UE to the one or more base stations.

The SRS resource configuration information includes: a physical resource of an SRS, a cycle and an offset of the SRS; and/or
- the valid duration configured for the SRS resource is absolute time or a duration relative to a moment when the UE starts to transmit an SRS; and/or
- the valid positioning area configured for the SRS resource is any one of the following areas: a cell or a cell list, a tracking area (TA) or a TA list, or an RNA.

S504, a communication base station transmits an RRC connection release message carrying the SRS resource configuration information to the UE.

The SRS resource configuration information carries a sounding reference signal (SRS) resource that is configured for the UE and used for location in an idle state or an inactive state.

S505, after receiving the RRC connection release message, the UE enters the idle state and transmits an SRS on a specified SRS resource according to the SRS resource configuration information carried in the RRC connection release message.

S506, the UE determines whether the condition of stopping transmitting the SRS is reached, if yes, an end step is executed, and otherwise step S505 is returned.

The condition of stopping transmitting the SRS, includes:
- determining that the condition of stopping transmitting the SRS is reached when the UE determines that any one of the following conditions is met: the valid duration being invalid, leaving the valid positioning area or the SRS resource being used up to the quantity of using times.

The SRS configuration information contains the valid duration, the UE enables a timer when entering the idle state, and a timing length of the timer is the valid duration length. Before the timer runs out of time, the UE transmits the SRS according to the configured SRS cycle. When the timer runs out of time, the UE stops transmitting the SRS.

If the configuration information contains the valid positioning area, the UE transmits the SRS according to the SRS configuration information within the valid positioning area. The UE, when moving beyond the valid positioning area, stops transmitting the SRS.

If the configuration information contains the quantity of using times, the UE enables a counter when entering the idle state, and the counter will be increased by 1 each time the SRS is transmitted. When the count of counter is equal to the quantity of using times in the configuration information, the UE will not transmit the SRS anymore.

If the configuration information contains a plurality of pieces of information among the valid duration, the valid positioning area and the quantity of using times, the UE stops transmitting the SRS when any one of the situations reaches the condition of stopping transmitting.

S507, the measurement base station receives the SRS resource transmitted by the LMF entity and performs an SRS measurement on the UE according to the SRS resource, and the LMF entity transmits information of the measurement base station to a base station to which a service cell where the UE is located belongs.

Step ends.

Implementation 2.

Figure 6:
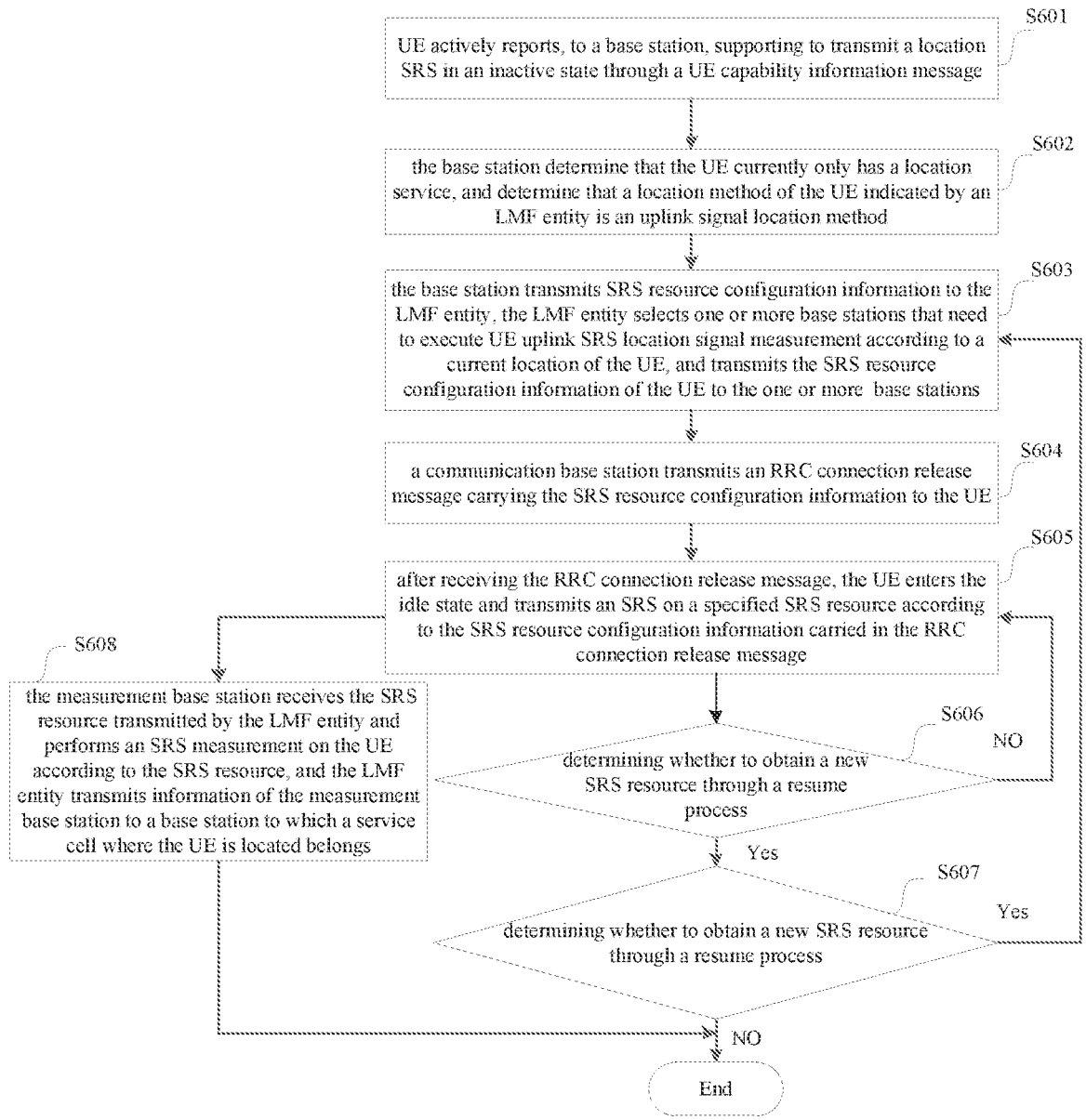
FIG. 6 is flow chart of uplink signal location in an inactive state.

FIG. 6 is a flow of uplink signal location in an inactive state, which includes the following steps.

S601, UE actively reports, to a base station, supporting to transmit a location SRS in an inactive state through a UE capability information message.

S602, when the base station may determine that the UE currently only has a location service, and determine that a location method of the UE indicated by an LMF entity is an uplink signal location method according to the UE capability information message and the service situation of the UE, S603 is executed.

If the location method indicated by the LMF entity is not the uplink signal location method, an existing flow is executed, such as a downlink signal location method of a wireless mobile system, which will not be repeated here.

S603, the base station transmits SRS resource configuration information to the LMF entity, the LMF entity selects one or more base stations that need to execute UE uplink SRS location signal measurement according to a current location of the UE, and transmits the SRS resource configuration information of the UE to the one or more base stations.

The SRS resource configuration information includes a physical resource of an SRS, a cycle and an offset of the SRS; and/or
- the valid duration configured for the SRS resource is absolute time or a relative duration relative to a moment when the UE starts to transmit an SRS; and/or
- the valid positioning area configured for the SRS resource is any one of the following areas: a cell or a cell list, a tracking area (TA) or a TA list, or an RNA.

S604, a communication base station transmits an RRC connection release message carrying the SRS resource configuration information to the UE.

The SRS resource configuration information carries a sounding reference signal (SRS) resource that is configured for the UE and used for location in an idle state or an inactive state.

S605, after receiving the RRC connection release message, the UE enters the idle state and transmits an SRS on a specified SRS resource according to the SRS resource configuration information carried in the RRC connection release message.

S606, the UE determines whether the condition of stopping transmitting the SRS is reached, if yes, S607 is executed, and otherwise S605 is returned.

The condition of stopping transmitting the SRS, includes:
- determining that the condition of stopping transmitting the SRS is reached when it is determined that any one of the following conditions is met: the valid duration being invalid, leaving the valid positioning area or the SRS resource being used up to the quantity of using times.

Accordingly, if the configuration information contains the valid duration, the UE enables the timer when entering the inactive state, and the timing length of the timer is the valid duration length. Before the timer runs out of time, the UE transmits the SRS according to the configured SRS cycle. When the timer runs out of time, the UE stops transmitting the SRS. The UE may enter the connected state through the resume process, and if the base station has a new SRS resource to be configured for the UE, the UE may use the new SRS resource to transmit the SRS subsequently.

If the configuration information contains the valid positioning area, the UE transmits the SRS according to the SRS configuration within the valid positioning area. The UE, when moving beyond the valid positioning area, stops transmitting the SRS. The UE may enter the connected state through the resume process (an RRC connection resume process), and if the base station has a new SRS resource to be configured for the UE, the UE may use the new SRS resource to transmit the SRS subsequently.

If the configuration information contains the quantity of using times, a counter is enabled when the UE enters the idle state, and the counter will be increased by 1 each time the SRS is transmitted. When the count of the counter is equal to the quantity of using times in the configuration information, the UE will not transmit the SRS anymore.

S607, determining whether to obtain a new SRS resource through a resume process, if yes, step S603 is executed, and if not, it ends.

S608, the measurement base station receives the SRS resource transmitted by the LMF entity and performs an SRS measurement on the UE according to the SRS resource, and the LMF entity transmits information of the measurement base station to a base station to which a service cell where the UE is located belongs.

Step ends.

Embodiment 2

Figure 7:
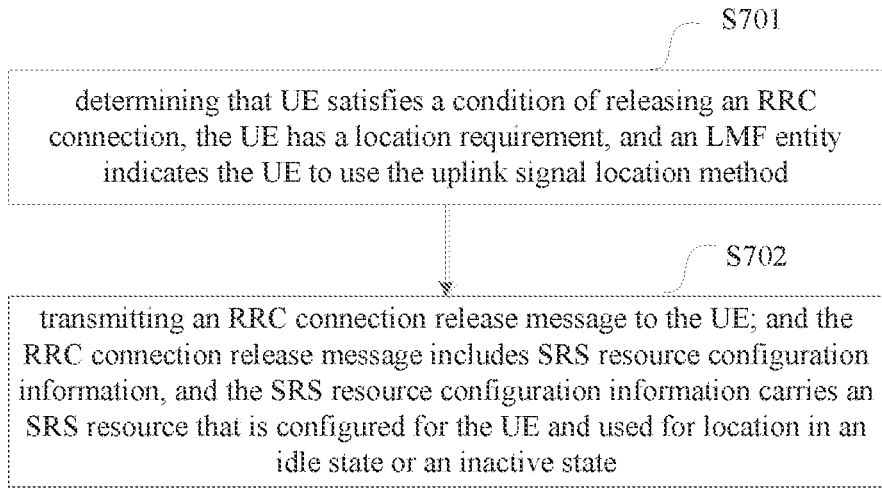
FIG. 7 is a flow chart of an uplink signal location method on a communication base station side provided by an embodiment of the present application.

The embodiments of the present application provide an uplink signal location method, applied to a communication base station, as shown in FIG. 7, including the following steps.

S701, determining that UE satisfies a condition of releasing an RRC connection, the UE has a location requirement, and an LMF entity indicates the UE to use the uplink signal location method.

S702, transmitting an RRC connection release message to the UE; and the RRC connection release message includes SRS resource configuration information, and the SRS resource configuration information carries an SRS resource that is configured for the UE and used for location in an idle state or an inactive state.

In one embodiment, the method further includes:
transmitting the SRS resource to the LMF entity, and the LMF entity transmits the SRS resource to a measurement base station, and the measurement base station performs an SRS measurement according to the SRS resource.

In one embodiment, the RRC connection release message further includes at least one piece of the following information:
a valid duration configured for the SRS resource;
a valid positioning area configured for the SRS resource; or
the quantity of using times configured for the SRS resource.

In one embodiment, the RRC connection release message further includes:
connection resume indication information, configured for indicating whether the UE obtains a new SRS resource for location by resuming the RRC connection when the UE is in the inactive state and reaches a condition of stopping transmitting an SRS.

In one embodiment, the method further includes:
receiving a UE capability information message reported by the UE, and determining that whether the UE supports to transmit an SRS in the idle state or the inactive state; or
obtaining a UE capability providing message reported by the UE from the LMF entity, and determining whether the UE supports to transmit an SRS in the idle state or the inactive state.

In one embodiment, the SRS resource configuration information includes a physical resource of an SRS, a cycle and an offset of the SRS; and/or
the valid duration configured for the SRS resource is absolute time or a duration relative to a moment when the UE starts to transmit an SRS; and/or
the valid positioning area configured for the SRS resource is any one of the following areas: a cell or a cell list, a tracking area (TA) or a TA list, or an RNA.

Figure 8:
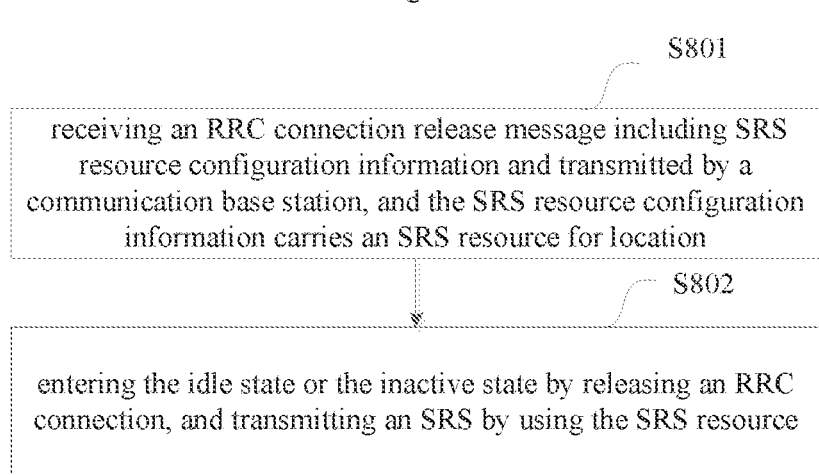
FIG. 8 is a flow chart of an uplink signal location method on a user equipment (UE) side provided by an embodiment of the present application.

The embodiments of the present application further provide an uplink signal location method, applied to UE, as shown in FIG. 8, including:
S801, receiving an RRC connection release message including SRS resource configuration information and transmitted by a communication base station, and the SRS resource configuration information carries an SRS resource for location; and,
S802, entering the idle state or the inactive state by releasing an RRC connection, and transmitting an SRS by using the SRS resource.

In one embodiment, the RRC connection release message further includes at least one piece of the following information:
a valid duration configured for the SRS resource;
a valid positioning area configured for the SRS resource; or
the quantity of using times configured for the configured for SRS resource.

In one embodiment, the method further includes:
stopping transmitting the SRS by using the SRS resource and keeping in the idle state when the UE is currently in the idle state and determines that a condition of stopping transmitting the SRS is reached.

In one embodiment, the method further includes:
obtaining a new SRS resource for location by entering a connected state through a resume process when the UE is currently in the inactive state and determines that a condition of stopping transmitting the SRS is reached.

In one embodiment, the method further includes:
when the UE determines that the condition of stopping transmitting the SRS is reached, determining whether to obtain a new SRS resource for location by entering a connected state through a resume process according to a connection resume indication in the RRC connection release message.

In one embodiment, the determining that the condition of stopping transmitting the SRS is reached, includes:
determining that the condition of stopping transmitting the SRS is reached when the UE determines that any one of the following conditions is met: the valid duration being invalid, leaving the valid positioning area or the SRS resource being used up to the quantity of using times.

In one embodiment, the method further includes:
reporting whether the UE supports to transmit the SRS in the idle state or the inactive state through a UE capability information message or a UE capability providing message.

In one embodiment, the SRS resource configuration information includes a physical resource of an SRS, a cycle and an offset of the SRS; and/or
the valid duration configured for the SRS resource being absolute time or a duration relative to a moment when the UE starts to transmit the SRS; and/or
the valid positioning area configured for the SRS resource being any one of the following areas: a cell or a cell list, a tracking area (TA) or a TA list, or an RNA.

Figure 9:
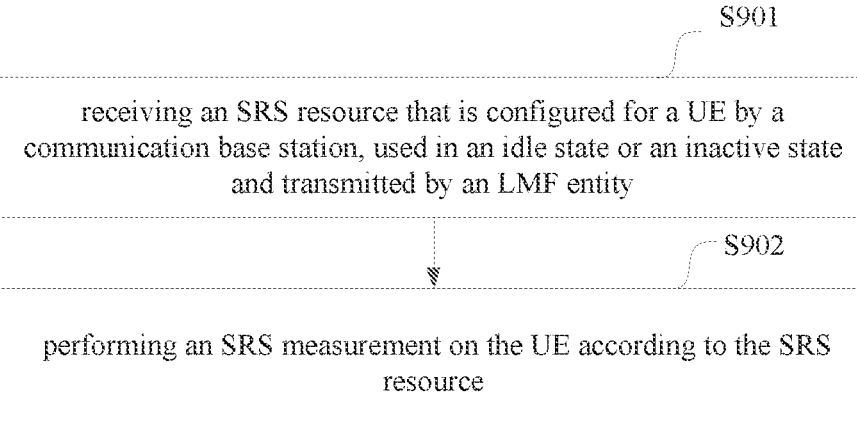
FIG. 9 is a flow chart of an uplink signal location method on a measurement base station side provided by an embodiment of the present application.

The embodiments the present application further provide an uplink signal location method, applied to a measurement base station, as shown in FIG. 9, including:
S901, receiving an SRS resource that is configured for a UE by a communication base station, used in an idle state or an inactive state and transmitted by an LMF entity; and
S902, performing an SRS measurement on the UE according to the SRS resource.

In one embodiment, the method further includes:
receiving at least one piece of the following information that is configured for the UE by the communication base station and transmitted by the LMF entity:
a valid duration configured for the SRS resource;
a valid positioning area configured for the SRS resource; or
the quantity of using times of the SRS resource.

The uplink signal location method on the communication base station side provided by the embodiments of the present application. Various implementations applied to uplink signal location of the communication base station in the system provided by the above embodiments may be applied to the uplink signal location method applied to the communication base station in the embodiments, which will not be repeated here.

The uplink signal location method on the UE side provided by the embodiments of the present application. Various implementations applied to uplink signal location of the UE in the system provided by the above embodiments may be applied to the uplink signal location method applied to the UE in the embodiments, which will not be repeated here.

The uplink signal location method on the measurement base station side provided by the embodiments of the present application. Various implementations applied to uplink signal location of the measurement base station in the system provided by the above embodiments may be applied to the uplink signal location method applied to the measurement base station in the embodiments, which will not be repeated here.

Embodiment 3

Figure 10:
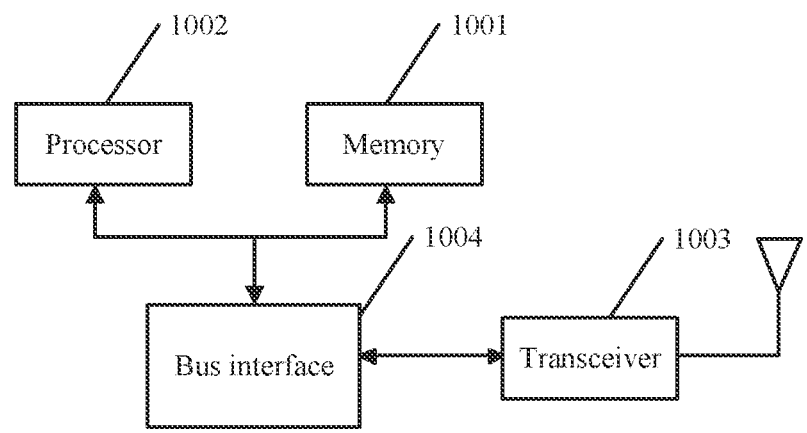
FIG. 10 is a schematic diagram of a communication base station for uplink signal location of an embodiment of the present application.

The embodiments of the present application provide a communication base station for uplink signal location, as shown in FIG. 10, includes:
a memory 1001, a processor 1002, a transceiver 1003 and a bus interface 1004.

The processor 1002 is responsible for managing a bus architecture and general processing, and the memory 1001 may store data used when the processor 1002 executes operations. The transceiver 1003 is configured to receive and transmit data under the control of the processor 1002.

The bus architecture may include interconnected buses of any quantity and bridges of any quantity, which link various circuits of one or more processors represented by the processor 1002 and various circuits of memories represented by the memory 1001. The bus architecture may also link various other circuits such as peripheral devices, voltage regulators, and power management circuits, which are well known in the art, and therefore are not further described herein. The bus interface provides an interface. The processor 1002 is responsible for managing the bus architecture and general processing, and the memory 1001 may store data used when the processor 1002 executes operations.

A flow disclosed in the embodiments of the present application may be applied to the processor 1002 or implemented by the processor 1002. During an implementation process, all steps of a signal processing flow may be completed by an integrated logic circuit of hardware or an instruction in the form of software in the processor 1002. The processor 1002 may be a general-purpose processor, a digital signal processor, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor may be a microprocessor, or any conventional processor, etc. The steps of the method disclosed in conjunction with the embodiments of the present application may be directly embodied to be executed and completed by a hardware processor, or may be executed and completed through a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 1001, and the processor 1002 reads information in the memory 1001, and completes the steps of the signal processing flow in combination with its hardware.

The processor 1002 is configured to read computer programs in the memory 1001 and execute:
determining that a UE satisfies a condition of releasing an RRC connection, the UE has a location requirement, and an LMF entity indicates the UE to use an uplink signal location method; and
transmitting an RRC connection release message to the UE, and the RRC connection release message includes SRS resource configuration information, and the SRS resource configuration information carries an SRS resource that is configured for the UE and used for location in an idle state or an inactive state.

In one embodiment, the processor is further configured to:
transmit the SRS resource to the LMF entity, and the LMF entity transmits the SRS resource to a measurement base station, and the measurement base station performs an SRS measurement according to the SRS resource.

In one embodiment, the RRC connection release message further includes at least one piece of the following information:
a valid duration configured for the SRS resource;
a valid positioning area configured for the SRS resource; or the quantity of using times configured for the SRS resource.

In one embodiment, the RRC connection release message further includes:

connection resume indication information, configured for indicating whether the UE obtains a new SRS resource for location by resuming the RRC connection when the UE is in the inactive state and reaches a condition of stopping transmitting an SRS.

In one embodiment, before transmitting the RRC connection release message to the UE, the processor is further configured to:

receive a UE capability information message reported by the UE, and determine whether the UE supports to transmit an SRS in the idle state or the inactive state; or obtain a UE capability providing message reported by the UE from the LMF entity, and determine whether the UE supports to transmit an SRS in the idle state or the inactive state.

In one embodiment, the SRS resource configuration information includes a physical resource of an SRS, a cycle and an offset of the SRS; and/or the valid duration configured for the SRS resource is absolute time or a duration relative to a moment when the UE starts to transmit an SRS; and/or the valid positioning area configured for the SRS resource is any one of the following areas: a cell or a cell list, a tracking area (TA) or a TA list, or an RNA.

Figure 11:
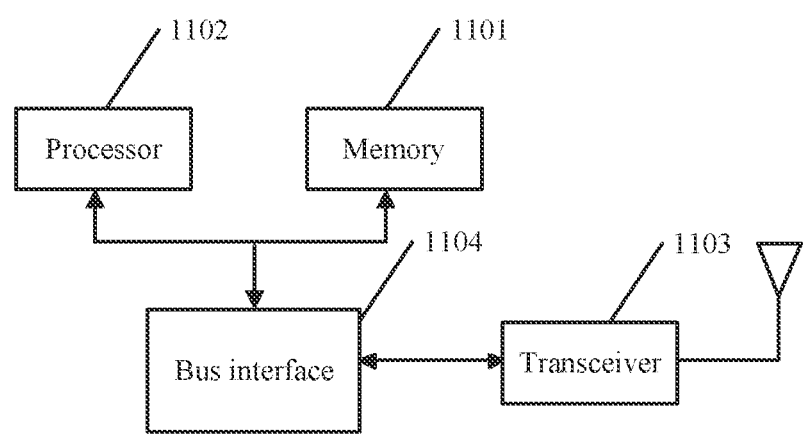
FIG. 11 is a schematic diagram of a user equipment (UE) for uplink signal location of an embodiment of the present application.

The embodiments of the present application provide a UE for uplink signal location, as shown in FIG. 11, includes:

a memory 1101, a processor 1102, a transceiver 1103 and a bus interface 1104.

The processor 1102 is responsible for managing a bus architecture and general processing, and the memory 1101 may store data used when the processor 1102 executes operations. The transceiver 1103 is configured to receive and transmit data under the control of the processor 1102.

The bus architecture may include interconnected buses of any quantity and bridges of any quantity, which link various circuits of one or more processors represented by the processor 1102 and various circuits of memories represented by the memory 1101. The bus architecture may also link various other circuits such as peripheral devices, voltage regulators, and power management circuits, which are well known in the art, and therefore are not further described herein. The bus interface provides an interface. The processor 1102 is responsible for managing the bus architecture and general processing, and the memory 1101 may store data used when the processor 1102 executes operations.

A flow disclosed in the embodiments of the present application may be applied to the processor 1102 or implemented by the processor 1102. During an implementation process, all steps of a signal processing flow may be completed by an integrated logic circuit of hardware or an instruction in the form of software in the processor 1102. The processor 1102 may be a general-purpose processor, a digital signal processor, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor may be a microprocessor, or any conventional processor, etc. The steps of the method disclosed in conjunction with the embodiments of the present application may be directly embodied to be executed and completed by a hardware processor, or may be executed and completed through a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 1101, and the processor 1102 reads information in the memory 1101, and completes the steps of the signal processing flow in combination with its hardware.

The processor 1102 is configured to read computer programs in the memory 1101 and execute:

receiving an RRC connection release message including SRS resource configuration information and transmitted by a communication base station, and the SRS resource configuration information carries an SRS resource that is configured for the UE and used for location in an idle state or an inactive state; and entering the idle state or the inactive state by releasing an RRC connection, and transmitting an SRS by using the SRS resource.

In one embodiment, the RRC connection release message further includes at least one piece of the following information:

a valid duration configured for the SRS resource;

a valid positioning area configured for the SRS resource; or the quantity of using times configured for the SRS resource.

In one embodiment, the processor is further configured to:

stop transmitting the SRS by using the SRS resource and keep in the idle state when the UE is currently in the idle state and determines that a condition of stopping transmitting the SRS is reached.

In one embodiment, the processor is further configured to:

obtain a new SRS resource for location by entering a connected state through a resume process when the UE is currently in the inactive state and determines that a condition of stopping transmitting the SRS is reached.

In one embodiment, the determining, by the processor, that the condition of stopping transmitting the SRS is reached, includes:

when the UE determines that a condition of stopping transmitting the SRS is reached, determining whether to obtain a new SRS resource for location by entering a connected state through a resume process according to a connection resume indication in the RRC connection release message.

In one embodiment, the determining, by the processor, that the condition of stopping transmitting the SRS is reached, includes:

determining that a condition of stopping transmitting the SRS is reached when the UE determines that any one of the following conditions is met: the valid duration being invalid, leaving the valid positioning area or the SRS resource being used up to the quantity of using times.

In one embodiment, the determining, by the processor, that the condition of stopping transmitting the SRS is reached, includes:

reporting whether the UE supports to transmit the SRS in the idle state or the inactive state through a UE capability information message or a UE capability providing message.

In one embodiment, the SRS resource configuration information includes a physical resource of an SRS, a cycle and an offset of the SRS; and/or the valid duration configured for the SRS resource is absolute time or a duration relative to a moment when the UE starts to transmit an SRS; and/or the valid positioning area configured for the SRS resource is any one of the following areas: a cell or a cell list, a tracking area (TA) or a TA list, or an RNA.

Figure 12:
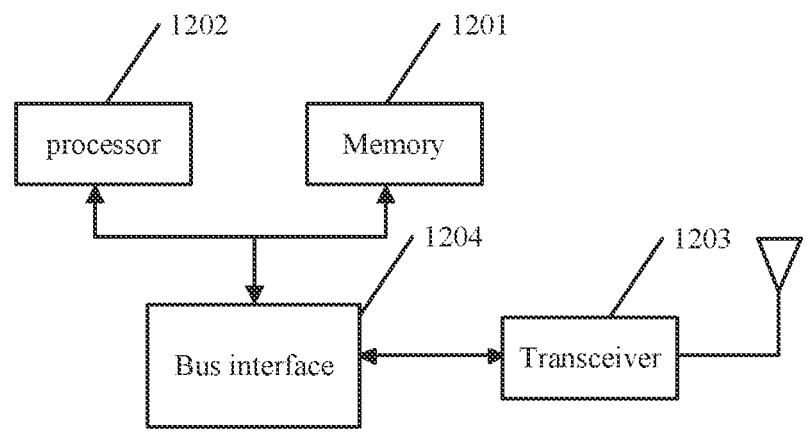
FIG. 12 is a schematic diagram of a measurement base station for uplink signal location of an embodiment of the present application.

The embodiments of the present application provide a measurement base station for uplink signal location, as shown in FIG. 12, includes:

a memory 1201, a processor 1202, a transceiver 1203 and a bus interface 1204.

The processor 1202 is responsible for managing a bus architecture and general processing, and the memory 1201 may store data used when the processor 1202 executes operations. The transceiver 1203 is configured to receive and transmit data under the control of the processor 1202.

The bus architecture may include interconnected buses of any quantity and bridges of any quantity, which link various circuits of one or more processors represented by the processor 1202 and various circuits of memories represented by the memory 1201. The bus architecture may also link various other circuits such as peripheral devices, voltage regulators, and power management circuits, which are well known in the art, and therefore are not further described herein. The bus interface provides an interface. The processor 1202 is responsible for managing the bus architecture and general processing, and the memory 1201 may store data used when the processor 1202 executes operations.

A flow disclosed in the embodiments of the present application may be applied to the processor 1202 or implemented by the processor 1202. During an implementation process, all steps of a signal processing flow may be completed by an integrated logic circuit of hardware or an instruction in the form of software in the processor 1202. The processor 1202 may be a general-purpose processor, a digital signal processor, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor may be a microprocessor, or any conventional processor, etc. The steps of the method disclosed in conjunction with the embodiments of the present application may be directly embodied to be executed and completed by a hardware processor, or may be executed and completed through a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 1201, and the processor 1202 reads information in the memory 1201, and completes the steps of the signal processing flow in combination with its hardware.

The processor 1202 is configured to read computer programs in the memory 1201 and execute:

receiving an SRS resource that is configured for UE by a communication base station, used in an idle state or an inactive state and transmitted by an LMF entity; and performing an SRS measurement on the UE according to the SRS resource.

In one embodiment, the processor 1202 is further configured to: receive at least one piece of the following information that is configured for the UE by the communication base station and transmitted by the LMF entity:

a valid duration configured for the SRS resource;
a valid positioning area configured for the SRS resource; or
the quantity of using times configured for the SRS resource.

The communication base station for uplink signal location provided by the embodiments of the present application. Various implementations applied to uplink signal location of the communication base station in the system provided by the above embodiments may be applied to the communication base station for uplink signal location in the embodiments, which will not be repeated here.

The UE for uplink signal location provided by the embodiments of the present application. Various implementations applied to the UE for uplink signal location in the system provided by the above embodiments may be applied to the uplink signal location UE in the embodiments, which will not be repeated here.

The measurement base station for uplink signal location provided by the embodiments of the present application. Various implementations applied to uplink signal location of the measurement base station in the system provided by the above embodiments may be applied to the measurement base station for uplink signal location in the embodiments, which will not be repeated here.

Figure 13:
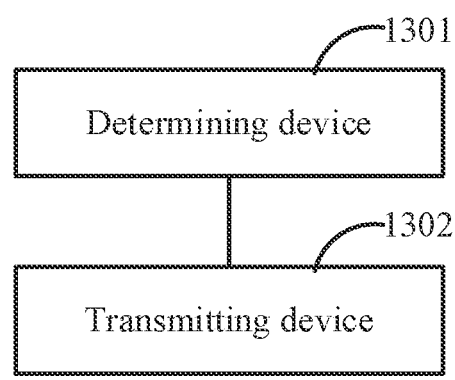
FIG. 13 is a schematic diagram of a communication base station for uplink signal location of an embodiment of the present application.

A communication base station for uplink signal location provided by the present application, as shown in FIG. 13, includes:

a determining device 1301, configured to determine that a UE satisfies a condition of releasing an RRC connection, the UE has a location requirement, and an LMF entity indicates the UE to use an uplink signal location method; and a transmitting device 1302, configured to transmit an RRC connection release message to the UE, and the RRC connection release message includes SRS resource configuration information, and the SRS resource configuration information carries a channel sounding reference signal (SRS) resource that is configured for the UE and used for location in an idle state or an inactive state.

In one embodiment, the transmitting device is further configured to:

transmit the SRS resource to the LMF entity, and the LMF entity transmits the SRS resource to a measurement base station, and the measurement base station performs an SRS measurement according to the SRS resource.

In one embodiment, the RRC connection release message further includes at least one piece of the following information:

a valid duration configured for the SRS resource;
a valid positioning area configured for the SRS resource; or
the quantity of using times configured for the SRS resource.

In one embodiment, the RRC connection release message further includes:

connection resume indication information, configured for indicating whether the UE obtains a new SRS resource for location by resuming the RRC connection when the UE is in the inactive state and reaches a condition of stopping transmitting an SRS.

In one embodiment, the determining device is further configured to:

receive a UE capability information message reported by the UE, and determine whether the UE supports to transmit an SRS in the idle state or the inactive state; or obtain a UE capability providing message reported by the UE from the LMF entity, and determine whether the UE supports to transmit the SRS in the idle state or the inactive state.

In one embodiment, the SRS resource configuration information includes a physical resource of an SRS, a cycle and an offset of the SRS; and/or the valid duration configured for the SRS resource is absolute time or a relative duration relative to a moment when the UE starts to transmit an SRS; and/or the valid positioning area configured for the SRS resource is any one of the following areas: a cell or a cell list, a tracking area (TA) or a TA list, or a radio access network notification area (RNA).

Figure 14:
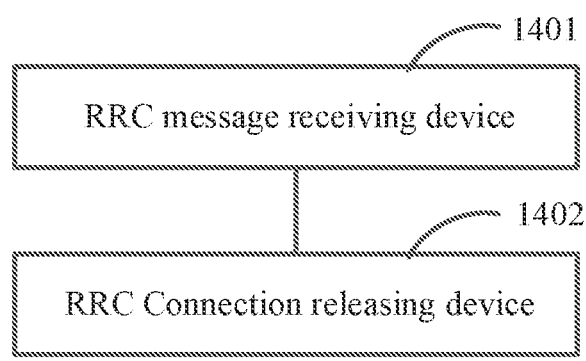
FIG. 14 is a schematic diagram of a user equipment (UE) for uplink signal location of an embodiment of the present application.

A UE for uplink signal location provided by the present application, as shown in FIG. 14, includes:

an RRC message receiving device 1401, configured to receive an RRC connection release message including SRS resource configuration information and transmitted by a communication base station, and the SRS resource configuration information carries an SRS resource that is configured for the UE and used for location in an idle state or an inactive state; and an RRC connection releasing device 1402, configured to enter the idle state or the inactive state by releasing an RRC connection, and transmit an SRS by using the SRS resource.

In one embodiment, the RRC connection release message further includes at least one piece of the following information:

a valid duration configured for the SRS resource;
a valid positioning area configured for the SRS resource; or
the quantity of using times configured for the SRS resource.

In one embodiment, the RRC connection releasing device is further configured to:

stop transmitting the SRS by using the SRS resource and keep in the idle state when the UE is currently in the idle state and determines that a condition of stopping transmitting the SRS is reached.

In one embodiment, the RRC connection releasing device is further configured to:

obtain a new SRS resource for location by entering a connected state through a resume process when the UE is currently in the inactive state and determines that a condition of stopping transmitting the SRS is reached.

In one embodiment, the RRC connection releasing device is further configured to:

determine, when the UE determines that a condition of stopping transmitting the SRS is reached, whether to obtain a new SRS resource for location by entering a connected state through a resume process according to a connection resume indication in the RRC connection release message.

In one embodiment, the determining, by the RRC connection releasing device, that the condition of stopping transmitting the SRS is reached, includes:

determining that the condition of stopping transmitting the SRS is reached when the UE determines that any one of the following conditions is met: the valid duration being invalid, leaving the valid positioning area or the SRS resource being used up to the quantity of using times.

In one embodiment, the RRC connection releasing device is further configured to:

report whether the UE supports to transmit the SRS in the idle state or the inactive state through a UE capability information message or a UE capability providing message.

In one embodiment, the SRS resource configuration information includes a physical resource of an SRS, a cycle and an offset of the SRS; and/or the valid duration configured for the SRS resource is absolute time or a relative duration relative to a moment when the UE starts to transmit the SRS; and/or the valid positioning area configured for the SRS resource is any one of the following areas: a cell or a cell list, a tracking area (TA) or a TA list, or an RNA.

Figure 15:
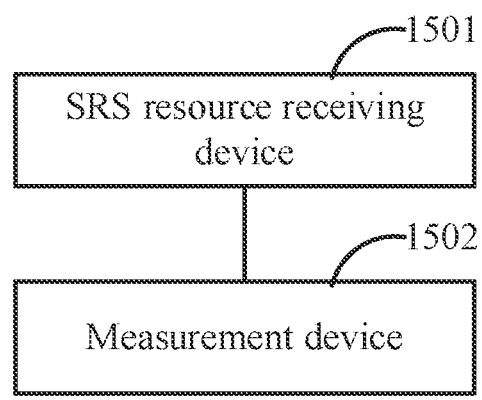
FIG. 15 is a schematic diagram of a measurement base station for uplink signal location of an embodiment of the present application.

A measurement base station for uplink signal location provided by the present application, as shown in FIG. 15, includes:

an SRS resource receiving device 1501, configured to receive an SRS resource that is configured for UE by a communication base station, used in an idle state or an inactive state and transmitted by an LMF entity; and a measurement device 1502, configured to perform an SRS measurement on the UE according to the SRS resource.

In one embodiment, the SRS resource receiving device 1501 is further configured to: receive at least one piece of the following information that is configured for the UE by the communication base station and transmitted by the LMF entity:

a valid duration configured for the SRS resource;
a valid positioning area configured for the SRS resource; or
the quantity of using times configured for the SRS resource.

The communication base station for uplink signal location provided by the embodiment of the present application. Various implementations applied to the communication base station for uplink signal location in the system provided by the above embodiments may be applied to the communication base station for uplink signal location in this embodiment, which will not be repeated here.

The UE for uplink signal location provided by the embodiment of the present application. Various implementations applied to the UE for uplink signal location in the system provided by the above embodiments may be applied to the UE for uplink signal location in this embodiment, which will not be repeated here.

The measurement base station for uplink signal location provided by the embodiments of the present application. Various implementations applied to the measurement base station for uplink signal location in the system provided by the above embodiments may be applied to the measurement base station for uplink signal location in this embodiment, which will not be repeated here.

The embodiments of the present application further provide a computer program medium, the computer program medium stores computer programs, and the computer programs, when executed by a processor, implements steps of the uplink signal location method applied to the communication base station provided by embodiment 2.

The present application further provides a computer program medium, the computer program medium stores computer programs, and the computer programs, when executed by a processor, implements steps of the uplink signal location method applied to the UE provided by embodiment 2.

The embodiments of the present application further provide a computer program medium, the computer program medium stores computer programs, and the computer programs, when executed by a processor, implements steps of the uplink signal location method applied to the measurement base station provided by embodiment 2.

In several embodiments provided by the present application, it should be understood that the disclosed systems, apparatuses and methods may be implemented in other ways. For example, the apparatus embodiment described above is only illustrative. For example, the division of the above modules is only a logical function division. In actual implementation, there may be other division modes, for example, a plurality of modules or components may be combined or integrated into another system, or some features may be ignored or not executed. On the other hand, the mutual coupling or direct coupling or communication connection shown or discussed may be indirect coupling or communication connection through some interfaces, apparatuses or modules, and may be electrical, mechanical or other forms.

The modules described as separate components may or may not be physically separated, and the components displayed as modules may or may not be physical modules, that is, they may be located in one place, or may be distributed to a plurality of network modules. Some or all of the modules can be selected according to actual needs to achieve the purpose of the solution of the embodiments.

In addition, each functional module in each embodiment of the present application may be integrated into one processing module, or each module may physically exist separately, or two or more modules may be integrated into one module. The above integrated module may be implemented in the form of hardware or a software functional module. If the integrated module is implemented in the form of software functional modules and is sold or used as an independent product, the integrated module may be stored in a computer readable storage medium.

In the above embodiments, it may be realized wholly or partially by software, hardware, firmware or any combination thereof. When implemented by the software, it may be implemented wholly or partially in the form of a computer program product.

The computer program product includes one or more computer instructions. When the computer program instructions are loaded and executed on a computer, flows or functions described in the embodiments of the present application are wholly or partially generated. The computer may be a general-purpose computer, a special-purpose computer, a computer network or other programmable apparatuses. The computer instructions may be stored in a computer readable storage medium, or transmitted from one computer readable storage medium to another computer readable storage medium, for example, the computer instructions may be transmitted from a website, computer, server or data center through wired modes (such as a coaxial cable, an optical fiber and a digital subscriber line (DSL)) or wireless modes (such as infrared, wireless and microwave) to another website, computer, server or data center. The computer readable storage medium may be any available medium that can be stored by the computer or a data storage device including a server, a data center and the like integrated by one or more available media. The available media may be magnetic media (such as a floppy disk, a hard disk and a magnetic tape), optical media (such as DVD) or a semiconductor medium (such as a solid state disk (SSD)) and the like.

The solution provided by the present application is described in detail above. Specific examples are used in the present application to describe the principle and implementation of the present application. The description of the above embodiments is only used to help understand the method and embodiments of the present application. In some embodiments of the present application, there will be changes in the specific implementations and scope of application. To sum up, the content of the specification should not be interpreted as a restriction on the present application.

The embodiments of the present application may be provided as methods, systems, or computer program products. Therefore, the present application may take the form of a full hardware embodiment, a full software embodiment, or an embodiment combining software and hardware. Besides, the present application may adopt the form of a computer program product implemented on one or more computer available storage media (including but not limited to a disk memory, a CD-ROM, an optical memory and the like) containing computer available program codes.

The present application is described with reference to the flow charts and/or block diagrams of the method, apparatus (system), and computer program product according to the present application. It should be understood that each flow and/or block in the flow charts and/or block diagrams and the combination of flows and/or blocks in the flow charts and/or block diagrams can be implemented by computer program instructions. These computer program instructions can be provided to processors of a general-purpose computer, a special-purpose computer, an embedded processor or other programmable data processing devices to generate a machine, and instructions executed by processors of a computer or other programmable data processing devices generate an apparatus for implementing the functions specified in one or more flows of the flow charts and/or one or more blocks of the block diagrams.

These computer program instructions may also be stored in a computer-readable memory capable of guiding a computer or other programmable data processing devices to work in a specific manner, and instructions stored in the computer-readable memory generate a manufactured product including an instruction apparatus, and the instruction apparatus implements the functions specified in one or more flows of the flow charts and/or one or more blocks of the block diagrams.

These computer program instructions may also be loaded on a computer or other programmable data processing devices, and a series of operation steps are executed on the computer or other programmable devices to produce computer-implemented processing, and thus, the instructions executed on the computer or other programmable devices provide steps for implementing the functions specified in one or more flows of the flow charts and/or one or more blocks of the block diagrams.

What is claimed is:

1. An uplink signal location method, applied to a communication base station, and comprising:
   determining that a user equipment (UE) satisfies a condition of releasing a radio resource control (RRC) connection, the UE has a location requirement, and a location management function (LMF) entity indicates the UE to use an uplink signal location method; and
   transmitting an RRC connection release message to the UE, wherein the RRC connection release message comprises sounding reference signal (SRS) resource configuration information, and the SRS resource configuration information carries an SRS resource configured for the UE and used for location if the UE is in an idle state or an inactive state; wherein the connection release message is configured to instruct the UE to release the RRC connection to enter the idle state or the inactive state.

2. The method according to claim 1, further comprising:
transmitting the SRS resource to the LMF entity, wherein the LMF entity transmits the SRS resource to a measurement base station, and the measurement base station performs an SRS measurement according to the SRS resource.

3. The method according to claim 1, wherein the RRC connection release message further comprises at least one piece of the following information:
a valid duration configured for the SRS resource;
a valid positioning area configured for the SRS resource;
the quantity of using times configured for the SRS resource; or
connection resume indication information, configured for indicating whether the UE obtains a new SRS resource for location by resuming the RRC connection when the UE is in the inactive state and reaches a condition of stopping transmitting an SRS.

4. The method according to claim 1, wherein before transmitting the RRC connection release message to the UE, the method further comprises:
receiving a UE capability information message reported by the UE, and determining whether the UE supports to transmit an SRS in the idle state or the inactive state; or
obtaining UE capability providing message reported by the UE from the LMF entity, and determining whether the UE supports to transmit an SRS in the idle state or the inactive state.

5. The method according to claim 3, wherein
the SRS resource configuration information comprises a physical resource of an SRS, a cycle and an offset of the SRS; and/or
the valid duration configured for the SRS resource is absolute time or a duration relative to a moment when the UE starts to transmit an SRS; and/or
the valid positioning area configured for the SRS resource is any one of the following areas:
a cell or a cell list;
a tracking area (TA) or a TA list; or
a radio access network notification area (RNA).

6. An uplink signal location method, applied to a user equipment (UE), and comprising:
receiving a radio resource control (RRC) connection release message comprising sounding reference signal (SRS) resource configuration information transmitted by a communication base station, wherein the SRS resource configuration information carries an SRS resource configured for the UE and used for location if the UE is in an idle state or an inactive state, and the connection release message is transmitted by the communication base station when it determines that the UE satisfies a condition of releasing an RRC connection, the UE has a location requirement and a location management function (LMF) entity indicates the UE to use an uplink signal location method; and
entering the idle state or the inactive state by releasing an RRC connection, and transmitting an SRS by using the SRS resource.

7. The method according to claim 6, wherein the RRC connection release message further comprises at least one piece of the following information:
a valid duration configured for the SRS resource;
a valid positioning area configured for the SRS resource; or
the quantity of using times configured for the SRS resource.

8. The method according to claim 7, further comprising:
stopping transmitting the SRS by using the SRS resource and keeping in the idle state when the UE is currently in the idle state and determines that a condition of stopping transmitting the SRS is reached; or,
obtaining a new SRS resource for location by entering a connected state through a resume process when the UE is currently in the inactive state and determines that a condition of stopping transmitting the SRS is reached; or,
when the UE determines that a condition of stopping transmitting the SRS is reached, the method further comprising:
determining whether to obtain a new SRS resource for location by entering a connected state through a resume process according to a connection resume indication in the RRC connection release message.

9. The method according to claim 8, wherein, the determining that the condition of stopping transmitting the SRS is reached, comprises:
determining that the condition of stopping transmitting the SRS is reached when the UE determines that any one of the following conditions is met:
the valid duration being invalid;
leaving the valid positioning area; or
the SRS resource being used up to the quantity of using times.

10. The method according to claim 6, further comprising:
reporting whether the UE supports to transmit the SRS in the idle state or the inactive state through a UE capability information message or a UE capability providing message.

11. A communication base station for uplink signal location, comprising a memory and a processor, wherein
the memory is configured to store computer programs;
the processor is configured to read the computer programs in the memory and execute the method of claim 1.

12. The communication base station according to claim 11, wherein the processor is further configured to:
transmit the SRS resource to the LMF entity, wherein the LMF entity transmits the SRS resource to a measurement base station, and the measurement base station performs an SRS measurement according to the SRS resource.

13. The communication base station according to claim 11, wherein the RRC connection release message further comprises at least one piece of the following information:
a valid duration configured for the SRS resource;
a valid positioning area configured for the SRS resource;
the quantity of using times configured for the SRS resource; or
connection resume indication information, configured for indicating whether the UE obtains a new SRS resource for location by resuming the RRC connection when the UE is in the inactive state and reaches a condition of stopping transmitting an SRS.

14. The communication base station according to claim 11, wherein before transmitting the RRC connection release message to the UE, the processor is further configured to:
receive a UE capability information message reported by the UE, and determine whether the UE supports to transmit an SRS in the idle state or the inactive state; or obtain a UE capability providing message reported by the UE from the LMF entity, and determine whether the UE supports to transmit an SRS in the idle state or the inactive state.

15. A user equipment (UE) for uplink signal location, comprising a memory and a processor, wherein
the memory is configured to store computer programs;
the processor is configured to read the computer programs in the memory and execute the method of claim 6.

16. The UE according to claim 15, wherein the RRC connection release message further comprises at least one piece of the following information:
a valid duration configured for the SRS resource;
a valid positioning area configured for the SRS resource; or
the quantity of using times configured for the SRS resource.

\* \* \* \* \*